Figures 1, 2:
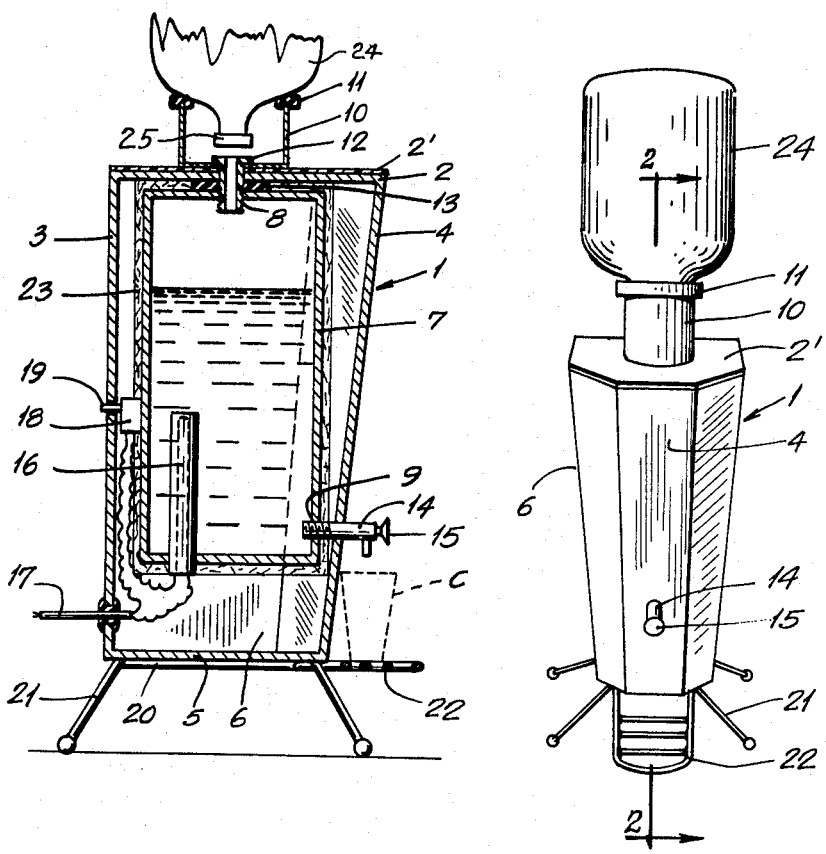

INVENTOR:
David LUPOVICI

AGENT 3,143,636
HOT LIQUID DISPENSER
David Lupovici, 7482 Spring Road, Cote St. Luc,
Quebec, Canada
Filed May 29, 1963, Ser. No. 284,156
3 Claims. (Cl. 219—314)

The present invention relates to a hot liquid dispenser and, more particularly, to an apparatus for dispensing hot water intended to be mixed with powdered food concentrates and adapted to be used in conjunction with a vending machine for such concentrates and of the type described and claimed in a co-pending application entitled: "Vending Machine," by the same inventor, filed on May 29, 1963 under Serial No. 284,157.

The hot liquid dispenser in accordance with the invention is particularly designed to be used in offices and other work areas where it is desired to have means for quickly preparing a cup of coffee, tea, soup, or the like.

The general object of the present invention resides in the provision of a dispenser of the character described, which is of light weight and portable construction, simple and inexpensive to manufacture, which can be installed in a minimum of space and which provides instantaneously a full cup of hot liquid and which enables several cups of hot liquid to be dispensed in succession at intervals of only a few seconds.

Another object of the present invention resides in the provision of a dispenser of the character described, in which the liquid replenishing means are simple to install.

Another object of the present invention resides in the provision of a dispenser of the character described, which is electrically operated for heating the liquid and takes a minimum of electric current.

The foregoing and other important objects of the present invention will become more apparent during the following disclosure and by referring to the drawings, in which:

FIGURE 1 is a perspective view of the dispenser and
FIGURE 2 is a longitudinal section of the same.

The dispenser comprises a casing 1, made of sheet or the like, and providing a flat top wall 2 preferably covered with a protecting sheet 2' of rubber, neoprene, or the like. Casing 1 has a back wall 3, a front wall 4, a bottom 5, and side walls 6, which may have inclined portions merging with the front wall 4.

A container 7, preferably made of copper or the like non-corroding material, is disposed within casing 1. The container 7 is preferably of cylindrical shape and is mounted in upright position within the casing. Container 7 has a threaded inlet opening 8 at the top thereof and a threaded outlet opening 9 made in the cylindrical wall thereof adjacent the bottom of said container.

A cup-shaped element 10 is mounted on the top wall 2 of casing 1 and its free edge is lined with a gasket 11, of rubber or the like resilient material. A flanged exteriorly threaded nipple 12, made of brass, nylon, or the like, is threaded within the inlet opening 8 of the container 7 and its flange engages the bottom of the cup-shaped element 10. A washer 13 surrounds the nipple 12 between the top wall 2 of the casing 1 and the top of the container 7. Thus, nipple 12 serves as a means to establish fluid communication between the cup element 10 and the inside of container 7 and also serves to suspend the container 7 from the top wall 2 of casing 1.

A tap 14 passes through the front wall 4 of casing 1 and is threaded within outlet opening 9 of container 7. This tap serves also to further secure the container 7 to the casing 1. Tap 14 is preferably of the type having a push knob 15 for opening the tap and discharging liquid therefrom.

An electric heating element 16, of the tube-enclosed type and such as used in electric kettles and the like, is mounted within container 7 and fixed therein, said element 16 being supplied with electricity by wires 17, connected in series with a thermostat 18.

Thermostat 18 is in heat contact with the metal cylindrical wall of container 7 and is disposed at the back of casing 1. It is provided with an adjusting screw 19 protruding from the back wall 3.

The casing 1, which is of elongated shape, is mounted in upright position on a base frame 20, preferably of wire work, and providing outwardly and downwardly protruding legs 21 and a shelf 22 protruding from the bottom of the front wall 4 of casing 1 and serving to hold a cup C, or the like receptacle underneath the discharge end of the tap 14.

The container 7 is covered with a layer of insulation 23, made of asbestos fabric, glass wool, or the like. A glass bottle 24 serves as a means for holding a supply of liquid, said bottle is of the type having narrow mouth 25 and is disposed in inverted position on the cup element 10 and supported thereby with mouth 25 spaced above the bottom of cup element 10 and flanged nipple 12.

The dispenser of the invention is used as follows:

Bottle 24 is filled with water or other liquid at substantially room temperature and to be dispensed in hot condition, and placed in inverted position over the cup-shaped element 10, the bottle being in contact with gasket 11. The bottle empties within the cup-shaped element 10 and into container 7 until the liquid level is above the mouth 25 of the bottle. If necessary, a hole may be made in cup-shaped element 10 above said liquid level to allow entrance of air within the bottle.

The thermostat 18 is regulated by adjusting screw 19, preferably to maintain the liquid within the container 7 at a temperature of between 150 and 195° F., the electric heating element 16 being connected by its supply cord to a standard power outlet. The heating element 16 has a capacity of preferably about 1000 watts.

The liquid contained in the container 7 will therefore be constantly maintained at the desired hot temperature by the heating element 16 controlled by thermostat 18. By convection, there will be liquid circulation between container 7 and bottle 24, and the liquid contents of said bottle 24 will become pre-heated at a lukewarm temperature.

A paper cup C, or other receptacle, is positioned on shelf 22 and knob 15 is depressed to open tap 14, which immediately dispenses water or other liquid of the desired hot temperature, due to the reserve of such hot liquid within container 7. Immediately the container is refilled with lukewarm liquid from the bottle 24; the thermostat 18 closes the circuit of heating element 16, heats up the liquid in the container 7 back to the desired temperature, whereby after four or five seconds, another cup of hot liquid can be dispensed from the apparatus.

Bottles 24 of various capacities may be used in conjunction with the same apparatus.

A minimum of electric current is needed for keeping the liquid in container 7 at the required temperature due to the fact that this container is insulated by insulation 23 and also by the air space surrounding the container and enclosed by casing 1.

The device is of very simple construction and provides a constant and immediately available supply of hot liquid, such as hot water. The dispenser is more particularly adapted to be used in conjunction with a machine for dispensing powered food concentrates to quickly prepare a cup of hot coffee, soup, tea, or the like.

While a preferred embodiment in accordance with the present invention has been illustrated and described, it is understood that various modifications may be resorted

What I claim is:

1. A hot liquid dispenser comprising, in combination, an elongated liquid container, means to support said container in upright position, said container having a restricted liquid inlet at its top and a liquid outlet near its bottom, a discharge tap connected to said outlet, an electrical heating element within said container, a cup-shaped element mounted above said container and rigidly secured thereto and having its bottom in communication with said inlet, a narrow-mouth bottle removably supported by said cup-shaped element in inverted position with the mouth of said bottle spaced above the bottom of said cup-shaped element and in vertical alignment with said liquid inlet, and thermostatic means responsive to the temperature of the liquid inside of said container, electrically connected to said electric heating element for controlling the heating of the same, whereby heating of the liquid in said container causes, by convection, liquid circulation between said bottle, said cup-shaped element and said container.

2. A hot liquid dispenser as claimed in claim 1, wherein said means to support said container include a casing enclosing said container and having a top wall and a front wall, said discharge tap extending at the exterior of said front wall, said cup-shaped element disposed on top of said top wall, the communication between the bottom of said cup-shaped element and the inlet of said container consisting of a flanged nipple threaded within said inlet, passing through said top wall and said bottom of said cup-shaped element and having its flange overlying said bottom, said nipple serving to secure said cup-shaped element and said container to the top wall of said casing.

3. A hot liquid dispenser comprising an elongated upright casing having a top wall, front wall, side walls, bottom wall, and back wall, a separate base including ground engaging legs secured to said bottom wall, a shelf integral with said base and protruding from the lower edge of said front wall, an elongated liquid container mounted in upright position within said casing, said container having a restricted threaded liquid inlet at its top and a restricted lateral threaded outlet near its bottom, a discharge tap extending through the front wall of said casing and threadedly connected to said outlet, said tap extending above said shelf, a cup-shaped element resting on the top wall of said casing and having a bottom, a flanged threaded nipple passing through said bottom of said cup-shaped element, said top wall of said casing and threaded within said inlet of said container with its flange overlying the bottom of said cup-shaped element to establish communication between said cup-shaped element and said liquid container, and to secure said liquid container and said cup-shaped element to the top wall of said casing, an electrical heating element mounted within said liquid container, a thermostat in heat contact with the side wall of said container and having an adjustable knob protruding from said back wall of said casing and electrically connected in series with said electric heating element, and a narrow mouth bottle removably supported by said cup-shaped element in inverted position with the mouth of said bottle spaced above the bottom of said cup-shaped element and in vertical alignment with said nipple.

References Cited in the file of this patent

UNITED STATES PATENTS

| | | |
|---|---|---|
| 2,767,960 | Fast | Oct. 23, 1956 |
| 2,784,879 | Fischer | Mar. 12, 1957 |
| 2,912,142 | Schultz | Nov. 10, 1959 |